United States Patent Office 3,269,969
Patented August 30, 1966

3,269,969
DISPERSING AGENTS FORMED BY THE HEAT TREATMENT OF INTERPOLYMERS CONTAINING ACRYLAMIDE AND METHACRYLAMIDE
Hans Fikentscher, Bad Durkheim, Hans Wilhelm, Ludwigshafen (Rhine), Heinrich Wirth, Frankenthal, Pfalz, and Karl Dachs, Ludwigshafen (Rhine), Germany, assignors to Badische Anilin- & Soda-Fabrik Aktiengesellschaft, Ludwigshafen (Rhine), Germany
No Drawing. Filed Dec. 21, 1962, Ser. No. 246,344
Claims priority, application Germany, July 12, 1955, B 36,446
11 Claims. (Cl. 260—29.6)

This application is a continuation-in-part of application Serial No. 596,852, filed July 10, 1956, and now abandoned.

The present invention relates to polymers which are especially active dispersing agents and protective colloids and to their production as well as to dispersions obtained with the aid of said polymers.

An object of the invention is the production of dispersions in water or aqueous media of solid substances which are insoluble or practically insoluble in water.

A further object of the invention is the production of dispersions in water or aqueous media of liquid substances which are immiscible or practically immiscible with water.

A further object of the invention is the production of dispersions in water or aqueous media of gaseous substances which are insoluble or practically insoluble in water.

A further object of the invention is the production of dispersions of solid or liquid substances which are insoluble or practically insoluble in water and which take part in reactions in the dispersed condition.

The term dispersions is intended to mean colloidally dispersed systems in which the dispersed particles have an average size of about 10 to 1,000 Angstrom units, and coarsely dispersed systems in which the dispersed particles have an average size of at least about 1,000 Angstrom units. Dispersions and dispersing are to be understood herein as being general expressions for colloidal or coarse distribution or dispersion and relate to solid, liquid or gaseous substances. The precise expression for the dispersions is suspension in the case of solid substances, emulsion in the case of liquid substances and foam in the case of gaseous substances.

The objects of the invention are achieved by preparing the dispersions with the aid of water-soluble copolymers which consist of unsaturated carboxylic acid amides with one another or of copolymers of one unsaturated carboxylic acid amide or two or more unsaturated carboxylic acid amides with one or more other polymerizable substances, and which have a K-value which has been increased by heating their aqueous or water-containing solutions to a temperature above 50° C. This treatment is hereinafter called the heat treatment.

As unsaturated carboxylic acid amides there come into question acrylamide and methacrylamide, and also acrylamides which are substituted in alpha- or beta-position by alkyl radicals or halogen, among which may be mentioned for example ethyl acrylamide, crotonamide or alphachlor-acrylamide. The acrylamides may also bear substituents on the nitrogen atom, as for example alkyl groups. Therefore N-methylacrylamide and N-ethyl-acrylamide are also suitable. Unsaturated dicarboxylic acid diamides may also be used for the production of the copolymers, as for example fumaric acid diamide.

When a copolymer is used which consists only of acrylamide and methacrylamide, the mixing proportions may be varied within wide limits for example from 6:94 to 94:6 parts by weight.

For the production of the copolymers, besides one or more of the unsaturated carboxylic acid amides, there are also suitable other water-soluble monomers which form water-soluble polymers. Therefore there come into question as further components for the copolymerization products from unsaturated carboxylic acid amides, for example vinyl lactams, such as vinyl pyrrolidone, vinyl caprolactam, acrylic acid and its homologues, such as methacrylic acid, their salts, vinyl ethers, such as vinyl methyl ether, maleic acid, fumaric acid and their salts, and vinyl imidazole.

As components for the copolymers of unsaturated carboxylic acid amides there also come into question however monomers which are insoluble in water or themselves yield water-insoluble polymers. With these monomers the ratio of the proportions of the mixture with the unsaturated carboxylic acid amides must be kept such that the copolymers yield stable aqueous solutions. The term stable is intended to mean that the copolymers do not separate from the solution even after standing for long periods. As monomers of this last-mentioned type there may be mentioned for example the nitriles, such as acrylonitrile and methacrylonitrile, vinyl ethers, such as vinyl propyl ether, vinyl esters, such as vinyl acetate and vinyl propionate, acrylic acid esters, such as acrylic acid methyl and ethyl esters, carboxylic acid amides which are disubstituted on nitrogen, such as N,N-diethylacrylamide, acrylic urea and, for example, vinyl halides.

The copolymers of unsaturated carboxylic acid amides with other monomers should contain at least 15% of acrylamide or methacrylamide or 15% of these two amides together. The following copolymers may for example be mentioned in particular: methacrylamide with vinyl pyrrolidone, methacrylamide with vinyl chloride, methacrylamide with acrylamide, methacrylamide with acrylamide and maleic acid, methacrylamide with vinyl pyrrolidone and fumaric acid diamide, acrylamide with methacrylamide and vinyl pyrrolidone, methacrylamide with N-diethyl acrylamide and vinyl pyrrolidone.

The K-value of the copolymers which have not yet been subjected to the heat treatment lie in general between 20 and 100. The K-value herein referred to are all determined in 1% aqueous solution according to Fikentscher, Cellulosechemie, 13 (1932), 58.

The duration of the heat treatment of the aqueous or water-containing solutions of the copolymers depends on the concentration of the solutions, on the treatment temperature, on the K-value of the initial material and on the desired K-value of the product after the heat treatment. It is advantageous to use about 5 to 40% solutions for the heat treatment, but solutions of lower concentration down to about 1% and more highly concentrated solutions up to about 70% may also be used. By the heat treatment the K-value of the copolymers is raised by about 40 to about 150 units, preferably by about 40 to about 100 units.

The treatment temperature can considerably exceed 50° C.; it may lie for example at 100°, 140° C. or more, as, for example, 170° C., when naturally the use of closed vessels is necessary.

At the higher treatment temperatures, even a treatment time of a few minutes, for example 10 minutes, may be sufficient, but at the lower treatment temperatures times of 10, 20, 40 or more hours may be necessary.

The following Table 1 shows the dependence of the K-value of a copolymer of 70 parts of methacrylamide and 30 parts of vinyl pyrrolidone in 20% aqueous solution on the temperature of the heat treatment, the time being constant:

TABLE 1

| Initial K-value | Time in hours | Temperature, °C. | Final K-value |
|---|---|---|---|
| 57.8 | 40 | 50 | 67.5 |
| 57.8 | 40 | 62 | 84.0 |
| 57.8 | 40 | 76 | 109.0 |
| 57.8 | 40 | 95 | 138.0 |

In the following Table 2 there is shown the dependence of the K-value on the duration of the heat treatment at constant temperature for the same copolymer in 20% aqueous solution:

TABLE 2

| Initial K-value | Time in hours | Temperature, °C. | Final K-value |
|---|---|---|---|
| 57.3 | 1.5 | 95 | 57.5 |
| 57.3 | 2.5 | 95 | 60.0 |
| 57.3 | 3.5 | 95 | 65.0 |
| 57.3 | 4.5 | 95 | 74.0 |
| 57.3 | 5.5 | 95 | 78.5 |
| 57.3 | 6.5 | 95 | 92.5 |
| 57.3 | 8.5 | 95 | 100.0 |
| 57.3 | 11.5 | 95 | 115.0 |
| 57.3 | 15.5 | 95 | 128.0 |
| 57.3 | 23.5 | 95 | 135.5 |
| 57.3 | 30 | 95 | 137.5 |
| 57.3 | 40 | 95 | 138.0 |

The following Table 3 shows the dependence of the K-value on the concentration of the solution at a constant temperature for the heat treatment and a constant treatment time; in this case a copolymer of 80 parts of methacrylamide and 20 parts of acrylamide was used:

TABLE 3

| Concentration in percent | Initial K-value | Time in hours | Temperature in °C. | Final K-value |
|---|---|---|---|---|
| 2 | 58.6 | 40 | 95 | 64.5 |
| 5 | 58.6 | 40 | 95 | 103.0 |
| 10 | 58.6 | 40 | 95 | 117.5 |
| 15 | 58.6 | 40 | 95 | 120.0 |
| 20 | 58.6 | 40 | 95 | 120.5 |

The following Table 4 shows the change in the K-value of a number of copolymers upon subjection to the heat treatment; in this table, MAm represents methacrylamide, Am acrylamide, VP vinylpyrrolidone, VCl vinyl chloride and M maleic acid:

TABLE 4

| Composition of copolymer | K-value before heat treatment | K-value after heat treatment |
|---|---|---|
| 70 MAm:30 VP | 55 | 130 |
| 30 MAm:70 VP | 91 | 120 |
| 80 MAm:20 VCl | 40 | 110 |
| 80 MAm:20 Am | 47 | 125 |
| 25 MAm:75 Am | 100 | 170 |
| 50 MAm:50 Am | 85 | 138 |
| 37.5 MAm:37.5 Am:25 M | 82.5 | 125.5 |

The heat treatment can be carried out in aqueous solution or in mixtures of water and other solvents. Such solvents are for example methanol, propanol, butanol, glycol, propane-diol, glycerine, acetone, methyl ethyl ketone, dimethyl formamide, acetonitrile, tetrahydrofurane, dioxane and many others. The solvent need not be completely miscible with water. It is important in every case that the heat treatment should be carried out in the presence of water.

The result of the heat treatment does not consist solely in the increase in the K-value or the viscosity of the copolymer treated. The copolymer treated has a considerably better solubility in water and in solvent mixtures containing water. A copolymer of, for example, 25 parts of methacrylamide and 75 parts of acrylamide having the K-value 100 is flocculated out from its aqueous solution by the addition of 50% methanol. After heating for 40 hours in aqueous solution at 95° C., the K-value increases to 170. At the same time a completely clear, viscous solution, for example in 60% methanol, is obtained. Other water-soluble copolymers of unsaturated carboxylic acid amides behave in a similar way. No discussion will be entered into here as to what theories can be put forward to explain why the heat treatment leads to excellent dispersing agents and protective colloids which are suitable for the preparation and stabilization of dispersions of all kinds, for example of water-insoluble solid substances or of liquid substances immiscible with water, and which are therefore suitable for the production of useful products, for example textile assistants, and are also suitable for technological purposes, for example for use as assistants in polymerization in heterogeneous phase.

The dispersing agents are used in amounts of at least 0.25% with reference to the substance to be suspended or emulsified. The usual amounts lie in about the range 0.5 to 5%. 10% or 100% may, however, equally be used. These amounts may be desirable when particular dispersing effects or special effects as protective colloids are to be produced.

Solid substances and liquids which are insoluble in water or immiscible with water, which are to be converted into aqueous suspensions or emulsions with the said new dispersing agents and protective colloids which have been produced by the heat treatment are for example monomeric substances of low or high molecular weight, such as oils, waxes, fats and hydrocarbons, or polymeric substances, such as nitrocellulose, condensation products of dicarboxylic acids and polyhydric alcohols, phenol resins and modified phenol resins, as for example alkylphenol resins or phenol resins boiled with colophony, cumarone resins and many other substances. The said particles of the substances have a size of between 10 and one million Angstrom units.

The conventional dispersing agents are surpassed in most cases in their activity by those herein described. Their special value, however, lies in the fact that with their aid it is possible to suspend and emulsify with great ease substances which could not be dispersed or could only be dispersed with great difficulty with the dispersing agents hitherto known and usual. These substances which have hitherto been incapable of dispersion or only dispersable with difficulty are for example the polyamides of dicarboxylic acids and diamines, as for example adipic acid and hexamethylene diamine, and polyamides which are derived from aminocarboxylic acids or their derivatives, as for example caprolactam or capryllic lactam, and also polyurethanes, urea-formaldehyde resins which are etherified with alcohols, as for example butanol, and their modifications with polyesters.

The preparation of emulsions with the aid of the agents herein described is carried out in the usual way, for example in shaking or stirring apparatus, emulsifying machines, colloid mills or in ultrasonic apparatus. Solutions of solid substances in organic solvents can also be emulsified in water in this way, for example alcoholic solutions or urea- or melamine-formaldehyde condensates. Other solvents are for example methanol, propanol, butanol, cyclohexanol, glycol, propane-diol, butane-diol, glycerine, butane-triol, acetone, methyl ethyl ketone, cyclohexanone, aliphatic and aromatic hydrocarbons as well as their halogen and nitro derivatives, dimethyl formamide, nitriles, such as propionitrile, ethers and cyclic ethers.

Solid substances, provided the particles are not already present in colloidal dispersion, can be colloidally suspended by trituration in ball mills in the presence of water and the new dispersing agents. Another possibility consists in dissolving the substances to be dispersed in organic solvents, mixing with aqueous solutions of the new products and then distilling off the solvent.

The coarse and colloidal suspensions and emulsions prepared according to this invention can be kept practically without limit, do not settle out and can be diluted with water before use. They are therefore eminently suitable for the production of useful products, for example in the pharmaceutical industry for the production of salves, pastes or emulsions containing disinfectants, in the textile assistant and lacquer industries for dispersing organic and inorganic dyestuffs and pigments, for the production of washing, finishing, impregnating and dressing agents, for putties, lacquer emulsions and for the production of agents for combatting pests. The proportion of dispersed substance in the suspensions and emulsions prepared according to this invention may amount to 20 to 60% with reference to the whole dispersion. Smaller amounts, as for example 10%, or higher amounts, as for example 80%, are however also suitable.

Numerous possibilities of use are also available for the new dispersing agents as auxiliaries in chemical reactions. Thus they are suitable for example as dispersing agents in the polymerization of monomers insoluble or soluble in water to polymers insoluble in water. Monomers which can be polymerized by the use of the said new dispersing agents and protective colloids are, for example, esters of unsaturated carboxylic acids, such as acrylic and methacrylic acid esters, vinyl and vinylidene halides vinyl esters, N-vinyl compounds, for example N-vinyl carbazole, C-vinyl compounds, such as styrene, their homologues and derivatives, N-disubstituted acrylamides, vinyl ketones and also all mixtures of such compounds with each other and with other unsaturated compounds, such as unsaturated monocarboxylic and dicarboxylic acids, their salts, esters, amides, nitriles, unsaturated alcohols and hydrocarbons. In this case also at least 0.25% of the dispersing agent is used with reference to the content of polymer formed.

Stable, non-settling suspensions or emulsions which are compatible with pigments are obtained which can be used for the above-mentioned purposes, as for example for the production of lacquers or varnishes. The new dispersing agents can also be used with great advantage in many other chemical reactions which are carried out in heterogeneous phase.

The advantage of the new dispersing agents and protective colloids is evidenced not only in the production and stabilization of extremely fine dispersions of solid and liquid substances; extremely fine gaseous dispersions, such as foams, may also be stabilized very effectively therewith. They can be mixed for this purpose with any soaps, wetting agents and foaming agents and thereby yield in general clear, homogeneous solutions. On the contrary other highly polymeric dispersing agents soluble in water, for example on the basis of polycarboxylic acid salts, are incompatible with foam-producing agents, such as aryl sulfonates, so that segregation takes place in aqueous solution. The necessary amount of the new dispersing agents to be used in foaming depends on the nature of the liquid and of the other agents used therewith and can readily be determined by preliminary experiment.

Such mixtures of foam-producing agents and the products obtained by the heat treatment of copolymers of unsaturated carboxylic acid amides can therefore be used with advantage wherever stable foams are required. They are suitable for example for the production of fire-extinguishing agents or for foaming glues on the basis of urea-formaldehyde condensates. By the addition of acid hardener substances the foams thus produced can be used inter alia for filling up hollow spaces.

By reason of their good action as protective colloids, the copolymers of unsaturated carboxylic acid amides which have been subjected to the heat treatment can also be advantageously added to soaps to improve the washing action.

In all the described possibilities of use, it is in general non-injurious, and in some cases even advantageous, by reason of the good compatibility of the dispersing agents herein described, to have present any other hitherto conventional dispersing agents or wetting agents.

The following examples will further illustrate this invention but the invention is not restricted to these examples. The parts are by weight.

Examples 1 to 7 give some explanation of a few possible methods of preparation of the new dispersing agents and protective colloids.

*Example 1*

A 20% aqueous solution of a copolymer derived from 70 parts of methacrylamide and 30 parts of vinyl pyrrolidone having the K-value 55 is heated for 40 hours at 95° C. The K-value thus increases to 130. The resultant viscous solution may be diluted readily in any proportion with water and methanol as well as with 60% aqueous solutions of ethanol, isopropanol or acetone. After drying the solutions, hard, transparent films are obtained.

*Example 2*

A 20% aqueous solution of a copolymer derived from 80 parts of methacrylamide and 20 parts of vinyl caprolactam having the K-value 40 is heated for 40 hours at 95° C. The K-value hereby rises to 110. The resultant highly viscous solution may be diluted with 60% aqueous solution of methanol, ethanol and acetone in any proportions.

*Example 3*

A 15% aqueous solution of a copolymer derived from 80 parts of methacrylamide and 20 parts of acrylamide having the K-value 47 is heated for 40 hours at 95° C. A product having the K-value 125 is obtained which can be diluted without limit with water and methanol as well as with 70% aqueous ethanol and 60% aqueous acetone.

*Example 4*

A 16% solution in water of a copolymer of 25 parts of methacrylamide and 75 parts of acrylamide having the K-value 100 is heated for 40 hours at 95° C., the K-value thereby rising to 170. The resultant highly viscous solution can be diluted without limit with water and 60% aqueous ethanol or 50% aqueous acetone. Upon drying the solutions, hard, transparent films are obtained.

*Example 5*

4.2 parts of methacrylamide and 1.8 parts of vinyl pyrrolidone are dissolved in 24.0 parts of water and polymerized under nitrogen for 8 hours at 75° C. after adding 0.009 part of azo-bis-isobutyronitrile. When polymerization has ended, the reaction solution is heated under a pressure of 4 atmospheres for 1 hour at 130° C. The K-value amounts to 132.

*Example 6*

40 parts of a 15% solution of acrylamide in water and 6 parts of methacrylamide in 14 parts of water are polymerized under nitrogen for 2½ hours at 75° C. in the presence of 0.024 part of azo-bis-isobutyronitrile. After the polymerization has ended, the reaction mixture is heated at 120° C. for 2 hours under a pressure of 3.5 atmospheres. The copolymer has the K-value 170.

*Example 7*

A polymethacrylamide having the K-value 19.5 is flocculated from aqueous solution upon the addition of alcohols. If it is heated in 20% aqueous solution for 20 hours at 95° C., however, the K-value increases to 32.5 and the solution may be diluted with 50% ethanol without flocculation taking place. After heating for 48 hours at 95° C., the product has the K-value 81.5 and dissolves in methanol and ethanol.

*Example 8*

100 parts of a condensation product derived from phthalic acid, glycerine and linseed oil fatty acid are stirred at a temperature of 60° C. with 100 parts of a 5% solution of a copolymer derived from 80% methacrylamide and 20% acrylamide which has been heated in 15% aqueous solution for 40 hours at 95° C. A creamy emulsion is obtained which flows well and may readily be spread.

*Example 9*

500 parts of paraffin (melting point 68 to 72° C.) are stirred with 500 parts of a 1% aqueous solution of a copolymer derived from 70 parts of methacrylamide and 30 parts of vinyl pyrrolidone which has been heated in 20% aqueous solution for 42 hours at 95° C. A stable creamy emulsion is formed which is suitable for the production of hydrophobing agents for textiles.

*Example 10*

125 parts of a polyamide derived from 60 parts of hexamethylene diamine adipate and 40 parts of caprolactam are dissolved in 1,000 parts of 60% aqueous methanol together with 10.0 parts of a 20% aqueous solution of a copolymer derived from 70% of methacrylamide and 30% of vinyl pyrrolidone which has been heated for 45 hours at 95° C. While stirring well, the methanol with some water is distilled off. There remains a stable aqueous dispersion of which the particle diameter amounts to 1 to 3 microns. The dispersion may be diluted with water within a wide range without losing its stability.

*Example 11*

50 parts of a 60% butanol solution of a reaction product of urea, formaldehyde and butanol are stirred with 50 parts of a 2% solution of a copolymer derived from 80 parts of methacrylamide and 20 parts of acrylamide which has been heated in 15% aqueous solution for 40 hours at 95° C. A stable emulsion is formed which is suitable for painting purposes, for example for lacquering wood or metal.

*Example 12*

50 parts of 2,4-dichlor-phenoxy-acetic acid butyl ester are mixed with 5 parts of a castor oil reacted with ethylene oxide and then while stirring vigorously there are added 45 parts of a 10% solution of a copolymer derived from 50 parts of methacrylamide and 50 parts of vinyl caprolactam which has been heated for 5 hours in a closed vessel at 115° C. A stable dispersion is obtained which, after dilution, for example in the ratio 1:200, can be sprayed as a weed eradicating agent.

*Example 13*

120 parts of a Heliogen Blue filter cake with 37% of dyestuff (Schultz, Farbstofftabellen, 7th edition, 2nd supplementary volume, page 85) are mixed well in a ball mill with 170 parts of a 1.5% aqueous solution of a copolymer derived from 80% of methacrylamide and 20% of vinyl caprolactam which has been heated in 20% aqueous solution for 30 hours at 95° C. A stable dye dispersion is obtained which before use can be diluted to any extent or mixed with paint emulsions.

*Example 14*

20 parts of a pigment mixture consisting of equal parts of iron oxide and titanium white are intimately mixed with 80 parts of a 5% aqueous solution of a copolymer derived from 25% of methacrylamide and 75% of acrylamide which has been treated for 30 hours at 95° C. A stable dispersion is obtained which can be diluted to any extent before use and can be used as a painting color or as an additive to other paints, for example paint emulsions.

*Example 15*

100 parts of linseed oil are stirred well with 100 parts of a 1% aqueous solution of a copolymer derived from 70% of methacrylamide and 30% of vinyl pyrrolidone which has been heated in 20% aqueous solution for 40 hours at 95° C. A stable emulsion is formed which can be used for painting purposes, for example with the addition of other substances such as color or paint emulsions.

*Example 16*

A mixture of 150 parts of acrylonitrile, 150 parts of butyl acrylate, 500 parts of water, 1 part of potassium persulfate and 20 parts of a 20% aqueous solution of a copolymer derived from 70% of methacrylamide and 30% of vinyl pyrrolidone, which has been heated for 40 hours at 95° C., is emulsified well in a mixing vessel. Half of this emulsion is heated while stirring in a nitrogen atmosphere at 70° C. During the course of an hour, the second half is allowed to flow in, 0.1 part of potassium persulfate dissolved in a little water is added and the polymerization is allowed to proceed to completion at 75° C. within a further half an hour. A stable emulsion is obtained which yields a clear film.

*Example 17*

400 parts of a 20% aqueous solution of a copolymer derived from 70% of methacrylamide and 30% of vinyl pyrrolidone, which has been heated for 40 hours at 95° C., and 100 parts of a 55% aqueous alkyl aryl sulfonate paste (alkyl=$C_{11}$ to $C_{13}$) are dissolved together in 400 parts of water. This solution is an excellent medium for the production of stable foams, for example of glues.

*Example 18*

600 parts of pulverulent polycaprolactam having a water content of 50% are thoroughly mixed for half an hour in an efficient stirring apparatus with 350 parts of water and 150 parts of a 20% solution of a copolymer derived from 70% of methacrylamide and 30% of vinyl pyrrolidone which has been heated for 40 hours at 95° C. A pasty dispersion capable of being spread is obtained.

*Example 19*

495 parts of 85% colloidal sulfur with a particle size of about 5 microns, 175 parts of a 20% solution of a copolymer derived from 70% of methacrylamide and 30% of vinyl pyrrolidone which has been heated for 40 hours at 95° C. and 30 parts of water are stirred violently for half an hour at room temperature or kneaded for 2 hours. A thick pasty dispersion is obtained which is suitable for the vulcanization of rubber.

*Example 20*

1,600 parts of a 50% solution of polyvinyl ethyl ether in petroleum ether are mixed with 640 parts of water and 200 parts of a 20% solution of a copolymer derived from 70% of methacrylamide and 30% of vinyl pyrrolidone which has been heated at 95° C. for 40 hours by stirring the components violently. While stirring vigorously, petroleum ether is distilled off for 2 hours up to a boiling point of the distillate of 95° C. After cooling, a pasty, brushable dispersion is obtained having a solids content of 51.3%.

*Example 21*

540 parts of a mixed polyamide derived from 60% of hexamethylene diamine adipate and 40% of caprolactam are dissolved in a solution of 1,700 parts of water in 2,100 parts of methanol at 68° C. After adding 40.5 parts of a copolymer derived from 70% of methacrylamide and 30% of vinyl pyrrolidone, which has been heated for 45 minutes at 140° C., 2,580 parts of a mixture consisting of 75.3% of methanol and 24.7% of water are distilled off. After cooling, a pasty dispersion is obtained which has a solids content of 29.8% and an average particle size of 5 microns.

We claim:

1. A process for preparing improved dispersing agents which comprises heating a water-containing solution of a copolymer from a mixture of at least two monomers selected from the group consisting of acrylamide, methacrylamide, vinyl pyrrolidone, vinyl caprolactam, vinyl chloride, vinyl methyl ether, vinyl propyl ether, vinyl acetate, vinyl propionate, and vinyl imidazole, at least 15% by weight of said mixture being monomers selected from the group consisting of acrylamide, methacrylamide, and mixtures thereof, said copolymer having a K-value of from about 20 to about 100 units, to a temperature of at least about 50° C. for a sufficient period of time to increase the K-value of the copolymer by from about 40 to about 150 units above the original K-value of the copolymer.

2. Dispersing agents which have been obtained according to the process as claimed in claim 1 and whose K-value has been increased by about 40 to about 150 units from an original K-value of from about 20 to about 100 units.

3. A process for preparing improved dispersing agents which comprises heating an aqueous solution of a copolymer from a mixture of at least two monomers selected from the group consisting of acrylamide, methacrylamide, vinyl pyrrolidone, vinyl caprolactam, vinyl chloride, vinyl methyl ether, vinyl propyl ether, vinyl acetate, vinyl propionate, and vinyl imidazole, at least 15% by weight of said mixture being monomers selected from the group consisting of acrylamide, methacrylamide, and mixtures thereof, said copolymer having a K-value of from about 20 to about 100 units, to a temperature of from about 50° C. to about 170° C. for a sufficient period of time to increase the K-value of said copolymer by from 40 to 100 units above the original K-value of the copolymer.

4. A process for preparing improved dispersing agents which comprises heating a water-containing solution of a copolymer from a mixture of from about 6 to about 94 parts by weight of acrylamide and from about 94 to about 6 parts by weight of methacrylamide, the K-value of said copolymer being from about 20 to about 100 units, to a temperature of at least about 50° C. for a sufficient period of time to increase the K-value of the copolymer by from about 40 to about 100 units above the original K-value of the copolymer.

5. A process for preparing improved dispersing agents which comprises heating an aqueous solution of a copolymer from a mixture of from about 6 to about 94 parts by weight of acrylamide and from about 94 to about 6 parts by weight of methacrylamide, the K-value of said copolymer being from about 20 to about 100 units, to a temperature of from about 50° C. to about 170° C. for a sufficient period of time to increase the K-value of said copolymer by from 40 to 100 units above the original K-value of the copolymer.

6. Aqueous dispersions containing from 0.25% to 100% by weight with reference to the dispersed substance of a water-soluble copolymer formed from a mixture of at least two vinyl monomers, at least 15% by weight of said mixture being monomers selected from the group consisting of acrylamide and methacrylamide, the K-value of said copolymer being raised from at least about 40 units above the original K-value of 20 to 100 units by heating a water-containing solution of the copolymer at a temperature of at least about 50° C., said dispersed substance being substantially insoluble in water and having a particle size of between 10 and one million Angstrom units.

7. Aqueous dispersions containing from 0.25% to 100% by weight with reference to the dispersed substance of a water-soluble copolymer formed from a mixture of at least two monomers selected from the group consisting of acrylamide, methacrylamide, vinyl pyrrolidone, vinyl caprolactam, vinyl chloride, vinyl methyl ether, vinyl propyl ether, vinyl acetate, vinyl propionate, and vinyl imidazole, at least 15% by weight of said mixture being monomers selected from the group consisting of acrylamide, methacrylamide, and mixtures thereof, the K-value of said copolymer being raised from 40 to 100 units above an original K-value of 20 to 100 units by heating a water-containing solution of the copolymer at a temperature of at least about 50° C., said dispersed substance being substantially insoluble in water and having a particle size of between 10 and one million Angstrom units.

8. Aqueous dispersions containing from 0.25% to 100% by weight with reference to the dispersed substance of a water-soluble copolymer formed from a mixture of at least two monomers selected from the group consisting of acrylamide, methacrylamide, vinyl pyrrolidone, vinyl caprolactam, vinyl chloride, vinyl methyl ether, vinyl propyl ether, vinyl acetate, vinyl propionate, and vinyl imidazole, at least 15% by weight of said mixture being monomers selected from the group consisting of acrylamide, methacrylamide, and mixtures thereof, the K-value of said copolymer being raised from 40 to 100 units above an original K-value of 20 to 100 units by heating an aqueous solution of the copolymer at a temperature of from about 50° C. to 170° C., said dispersed substance being substantially insoluble in water and having a particle size of between 10 and one million Angstrom units.

9. A process for forming a stable dispersion of substances which are substantially insoluble in water and which have a particle size of between 10 and one million Angstrom units which comprises adding to an aqueous medium containing said substances from about 0.25% to about 100% by weight based on the weight of said dispersed substance of a water-soluble copolymer formed from a mixture of at least two vinyl monomers, at least 15% by weight of said mixture being monomers selected from the group consisting of acrylamide and methacrylamide, copolymer having the K-value of said monomers being raised by at least about 40 units above an original K-value of 20 to 100 units by heating a water-containing solution of the copolymer at a temperature of at least about 50° C.

10. A process for forming a stable dispersion of substances which are substantially insoluble in water and which have a particle size of between 10 and one million Angstrom units which comprises adding to an aqueous medium containing said substances from about 0.25% to about 100% by weight based on the weight of said dispersed substance of a water-soluble copolymer formed from a mixture of at least two monomers selected from the group consisting of acrylamide, methacrylamide, vinyl pyrrolidone, vinyl caprolactam, vinyl chloride, vinyl methyl ether, vinyl propyl ether, vinyl acetate, vinyl propionate, and vinyl imidazole, at least 15% by weight of said mixture being monomers selected from the group consisting of acrylamide, methacrylamide, and mixtures thereof, the K-value of said copolymer being raised from 40 to 100 units above an original K-value of 20 to 100 units by heating a water-containing solution of the copolymer to a temperature of at least about 50° C.

11. A process for forming a stable dispersion of substances which are substantially insoluble in water and which have a particle size of between 10 and one million Angstrom units which comprises adding to an aqueous medium containing said substances from about 0.25% to about 100% by weight based on the weight of said dispersed substance of a water-soluble copolymer formed from a mixture of at least two monomers selected from the group consisting of acrylamide, methacrylamide, vinyl pyrrolidone, vinyl caprolactam, vinyl chloride, vinyl methyl ether, vinyl propyl ether, vinyl acetate, vinyl propionate, and vinyl imidazole, at least 15% by weight of said mixture being monomers selected from the group consisting of acrylamide, methacrylamide, and mixtures thereof, the K-value of said copolymer being raised from 40 to 100 units above an original K-value of 20 to 100 units by heating an aqueous solution of the copolymer to a temperature of from about 50° C. to about 170° C.

References Cited by the Examiner
UNITED STATES PATENTS

| | | | |
|---|---|---|---|
| 2,504,074 | 4/1950 | Jones | 260—80.3 |
| 2,533,166 | 12/1950 | Jones | 96—114 |
| 2,541,474 | 2/1951 | Lowe et al. | 96—114 |
| 2,632,704 | 3/1953 | Lowe et al. | 96—114 |

SAMUEL H. BLECH, *Primary Examiner.*
P. LIEBERMAN, *Assistant Examiner.*